No. 888,459. PATENTED MAY 26, 1908.
H. J. BOLINSKI.
FRUIT PICKER.
APPLICATION FILED SEPT. 12, 1907.
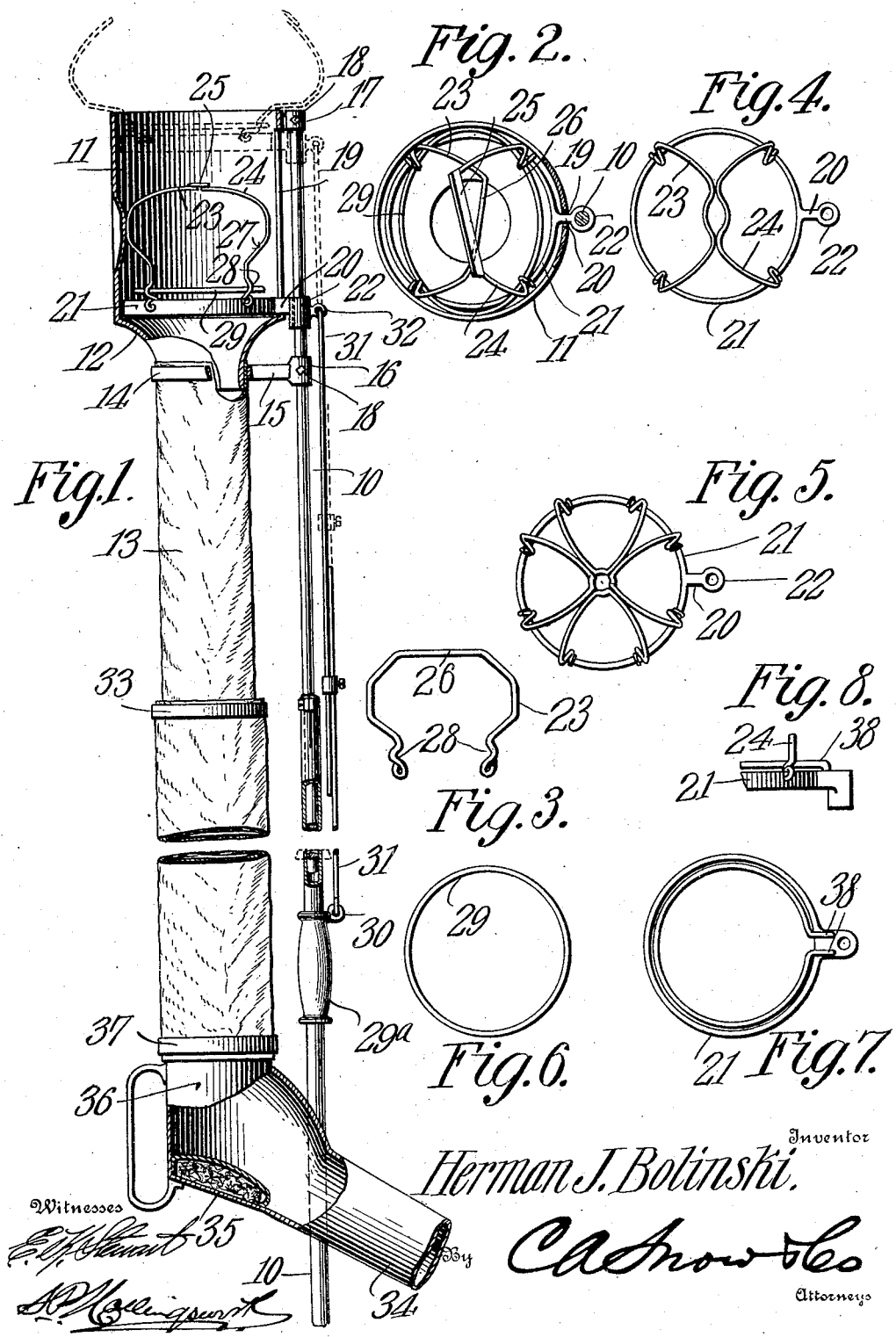
Witnesses
Inventor
Herman J. Bolinski.
By C. A. Snow & Co.
Attorneys

UNITED STATES PATENT OFFICE.

HERMAN J. BOLINSKI, OF NEW LONDON, WISCONSIN.

FRUIT-PICKER.

No. 888,459.  Specification of Letters Patent.  Patented May 26, 1908.

Application filed September 12, 1907. Serial No. 392,586.

*To all whom it may concern:*

Be it known that I, HERMAN J. BOLINSKI, a citizen of the United States, residing at New London, in the county of Waupaca and State of Wisconsin, have invented a new and useful Fruit-Picker, of which the following is a specification.

This invention relates to a fruit picker or gatherer of novel form and construction, and has for its object to provide a simple, light and efficient device by means of which fruit may be gathered from a tree either by cutting its stem or pulling it off the branch where the stem is very short, and after passing the fruit through a flexible chute onto a pad to break its fall and prevent bruising, it is carried by means of a guideway or preferably tubular form to a basket or other receptacle.

Another object of the invention is to provide a frame on which the picking fingers are pivoted which may be quickly removed from the implement and another inserted in its place carrying fingers of a different form, these changes being desired when fruit of different kinds are to be picked.

With these and other ends in view, the invention comprises the various novel features of construction and combination and arrangement of parts, which will be hereinafter more fully described, and pointed out particularly in the appended claims.

In the accompanying drawings:—Figure 1 is an elevation of the improved fruit picker, portions being shown in section. Fig. 2 is a top plan view showing clearly the picker fingers to one of which a knife is attached. Fig. 3 is a detail view of one of the picker fingers. Figs. 4 and 5 are plan views of modified forms of picker fingers. Fig. 6 is a view of a circular or ring-like spring used to hold the picker fingers in open position. Fig. 7 is a plan view of a modified form of spring. Fig. 8 shows a modified form of picker finger used with the spring illustrated in Fig. 7.

Corresponding parts in the several figures are indicated throughout by similar characters of reference.

Bolted to one end of a rod 10, preferably of circular form in cross section, is a cylindrical head 11 which may be made of sheet metal, wood, or other light material open at the top and provided with a reduced neck 12 at the bottom from which hangs a conduit or chute 13 fastened to the neck 12 by a joined ring 14 from which an arm 15 projects carrying a sleeve 16 through which the rod 10 passes. At the top of the cylinder is a similar sleeve or bearing 17 into which the end of the rod 10 is inserted. Bolts 18 fasten the rod to the bearings 16 and 17. Through the side of the cylinder or head next the rod 10 is made a vertical slot 19 for the passage of a strip or neck 20 on a circular ring-like frame 21, the latter movable within the head in a vertical direction. The outer end of the neck 20 has a sleeve 22 slidably mounted on the rod 10 and adapted to move up and down on said rod to carry the frame 21 from the bottom of the head to the top.

Pivotally connected to the frame 21 are two picker fingers 23 and 24, the latter carrying a knife or cutter 25. Each finger is formed of a length of wire bent to such shape as will be most convenient to grasp and remove the fruit from trees. In that form of finger shown in Fig. 1, there is a straight horizontal portion 26 at the top of the finger, the sides of which curve rearwardly and in a downward direction and then slightly inward to produce inclined surfaces 27, thence downwardly to the frame 21. Near the frame 21 the lower ends of the finger have a slight outward bend 28 to form a support for and in which rests a circular spring 29 which tends to open or move the picker finger away from the center. Two fingers like the one described are preferred when picking fruit having stems to be cut, in which case the knife 25 is fastened to one of the fingers on the flat horizontal portion 26 and arranged to overlap the other finger. The flat portions of the two fingers are disposed at an angle to each other so that when brought together they will produce a shear cut and sever the stem of the fruit gathered.

The rod 10 may be made telescopic, as shown, so that the implement may be extended to reach the top of the highest tree. The lower end of the rod carries a sliding hand grip 29$^a$ having an eye 30 on its upper end in which is fastened the lower end of a connecting rod 31 leading up to a similar eye 32 on the reciprocating sleeve 22. By moving the hand grip 29$^a$ up and down on the rod 10, the frame 21 will be raised and lowered in the cylinder or head 11. The rod 31 is made in two parts, as indicated in the drawings, so that it may be lengthened or shortened when the length of the rod 10 is changed.

The flexible conduit 13 is made of some textile fabric, rubber, leather, or other yielding substance, canvas being considered the most suitable material for the purpose. The chute 13 may be divided into two parts connected by bands or rings, the outer one, 33, being shown in the drawing. This connection between the two parts of the chute or conduit may be an extensible one, so that the length of the conduit may be increased as the rod 10 is extended. The lower end of the conduit 13 is fastened to a chute or covered trough 34 in the bottom of which just below the conduit 13 is placed a cushion or pad 35 on which the gathered fruit falls before passing down the trough. This cushion breaks the fall and prevents the fruit from being bruised during its journey to the collecting receptacle. The covered trough 34 is preferably made, as shown in the drawing, with an upstanding tubular part 36 for the lower end of the conduit 13, which is fastened thereto by a ring 37, and the trough proper, the latter having a downward inclination.

In operation, the lower end of the rod 10 is grasped in one hand below the grip 29$^a$, the other hand holding the grip. The implement is then raised until the head 11 is below the fruit to be picked. The grip 29$^a$ is then raised, causing the circular frame 21 with the picker fingers hinged thereon to be carried to the top of the head 11, as shown in dotted lines in Fig. 1. As the fingers emerge from the head, the spring 29, which has been heretofore under compression, expands, forcing the fingers apart until the inclined surfaces 27 thereof extend over the top edge of the cylinder. The implement is now raised until the fruit to be picked is within the head a short distance when the hand grip 29$^a$ will be drawn down, bringing the frame 21 with it. The movement of the frame 21 will, of course, carry with it the picker fingers which will be closed by the upper edge of the cylinder as the inclined portions of the fingers pass over it. The closure of the fingers causes the knife 25 to pass across the horizontal portion 26 of the coöperating finger and sever the stem of the fruit, which latter then falls through the conduit 13 onto the cushion 35, thence by way of the closed trough 34 to the receptacle. The fingers are kept closed while in the head 11 by contact with the sides thereof.

In Fig. 4 is shown one modification of the picker fingers where, instead of a knife being used to sever the fruit, the coacting ends of each finger are curved so as to form, when brought together, a space between them. This form of picker finger will be used on such fruit as are picked without stems. Instead of two fingers, as shown in Fig. 4, four fingers of the same type may be used, as indicated in Fig. 5.

In place of the circular spring 29 for opening the picker fingers, that form shown in Fig. 7 may be employed. In this instance, instead of using a closed spring, one side is left open and has fingers 38 projecting outwardly from the spring parallel to each other, which fingers are attached to the frame 21. When this form of spring is used, the lower end of the picker fingers may be made straight, as represented in Fig. 8, as the spring is self supporting and does not require the offsets 28 to support it.

A fruit picker constructed as described may be made light, strong and be readily handled; by means of its extensibility fruit upon the highest limbs of a tree can be removed; and its operation is quick and secure. By using the cutting fingers, fruit, such as apples, pears, and like varieties having stems, are picked without shaking the branches of the trees and causing other fruit to fall to the ground. The type of fingers shown in Figs. 4 and 5 are better in gathering citrus and other fruits marketed without stems.

Although the picking finger which is shown in detail in Fig. 3 has been described as formed of wire it is to be understood that the same may be made of sheet metal, wire fabric, or of any other preferred material.

What is claimed is:—

1. An implement of the class described comprising a hollow head open at the top, an open frame vertically movable therein through which fruit falls, picker fingers pivoted to said frame, and means whereby said fingers are adapted to open automatically outside the head when the frame is raised and to close together as it is being lowered and drawn into the head.

2. An implement of the class described comprising a cylindrical head open at the top to receive fruit, a ring-shaped frame within said head and adapted to move vertically, picker fingers pivoted on said frame and carried wholly within and out of said head when the frame is operated, and a knife on one of said picker fingers.

3. In an implement of the class described, a hollow head open at the top, means at one side for supporting the same, an open frame through which fruit can pass within said head adapted to move in a vertical direction, picker fingers pivoted to said frame, and a spring tending to force said fingers apart when carried out through the open top of said frame.

4. An implement of the class described comprising a cylindrical head having a slot in one side extending vertically, an open frame within said head having a neck arranged to slide in said slot and having a sleeve on its outer end, picker fingers in said frame, a supporting rod attached to said head and passing through said sleeve to serve as a guide therefor, a sliding grip on the lower end of the rod, and means connecting said grip and sleeve for raising and lowering the picker fingers when the grip is moved up and down on the rod.

5. An implement of the class described having a supporting rod, an open head having a reduced neck on its lower end fastened to said rod, an open frame within said head having a sleeve extending through a vertical slot in said head and slidably mounted on said rod, picker fingers hinged to said frame, a spring for opening said fingers when raised above the top of the head, and means on said rod for raising and lowering said frame to carry the picker fingers out of said head to embrace the fruit to be picked and sever it from the limb of the tree.

6. An implement of the class described comprising a hollow head open at the top, an open frame vertically movable in said head, a pair of spring actuated coöperating picking fingers hinged to said frame, one of said fingers overlapping the other, and a cutting blade attached to one of the fingers.

In testimony that I claim the foregoing as my own, I have hereto affixed my signature in the presence of two witnesses.

HERMAN J. BOLINSKI.

Witnesses:
   CHAS. A. HOLMES,
   J. BROMSCHINSKI.